United States Patent
Sano et al.

(10) Patent No.: US 7,065,291 B2
(45) Date of Patent: Jun. 20, 2006

(54) METHOD OF PROCESSING DATA PACKETS, AND VIDEO RECORDING/PLAYBACK APPARATUS INCORPORATING THE METHOD

(75) Inventors: Hiroyuki Sano, Kanagawa (JP); Kiminori Sugisaki, Kanagawa (JP); Hiroyuki Tominaga, Tokyo (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 09/784,630

(22) Filed: Feb. 15, 2001

(65) Prior Publication Data

US 2001/0026680 A1   Oct. 4, 2001

(30) Foreign Application Priority Data

Feb. 17, 2000   (JP) .............................. 2000-039956

(51) Int. Cl.
  *G11B 5/00* (2006.01)
  *H04N 7/26* (2006.01)
  *H04N 5/781* (2006.01)

(52) U.S. Cl. ...................... 386/111; 386/124; 386/126; 386/40; 386/125; 386/111; 360/32

(58) Field of Classification Search ................ 386/124, 386/111, 126, 32; 36/32; 360/32; 382/236
See application file for complete search history.

(56) References Cited

U.S. PATENT DOCUMENTS

| 6,570,945 B1* | 5/2003 | Ono et al. ................... 375/359 |
| 6,633,578 B1* | 10/2003 | Matsumaru et al. ........ 370/419 |
| 2003/0194037 A1* | 10/2003 | Ono et al. ................... 375/372 |

* cited by examiner

*Primary Examiner*—Mehrdad Dastouri
*Assistant Examiner*—Jamie Vent
(74) *Attorney, Agent, or Firm*—Frommer Lawrence & Haug LLP; William S. Frommer; Thomas F. Presson

(57) ABSTRACT

In a video recording/playback apparatus, when recording a series of packets transmitted over an IEEE 1394 bus, a relative value is taken between a requested time of arrival written in a header portion and a cycle time at the time of reception, and then the requested time of arrival is replaced with the relative value. When playing back the series of packets, the relative value is added to a cycle time at the time of transmission, and the relative value is replaced by the obtained value which will be used as a requested time of arrival for playback.

17 Claims, 5 Drawing Sheets

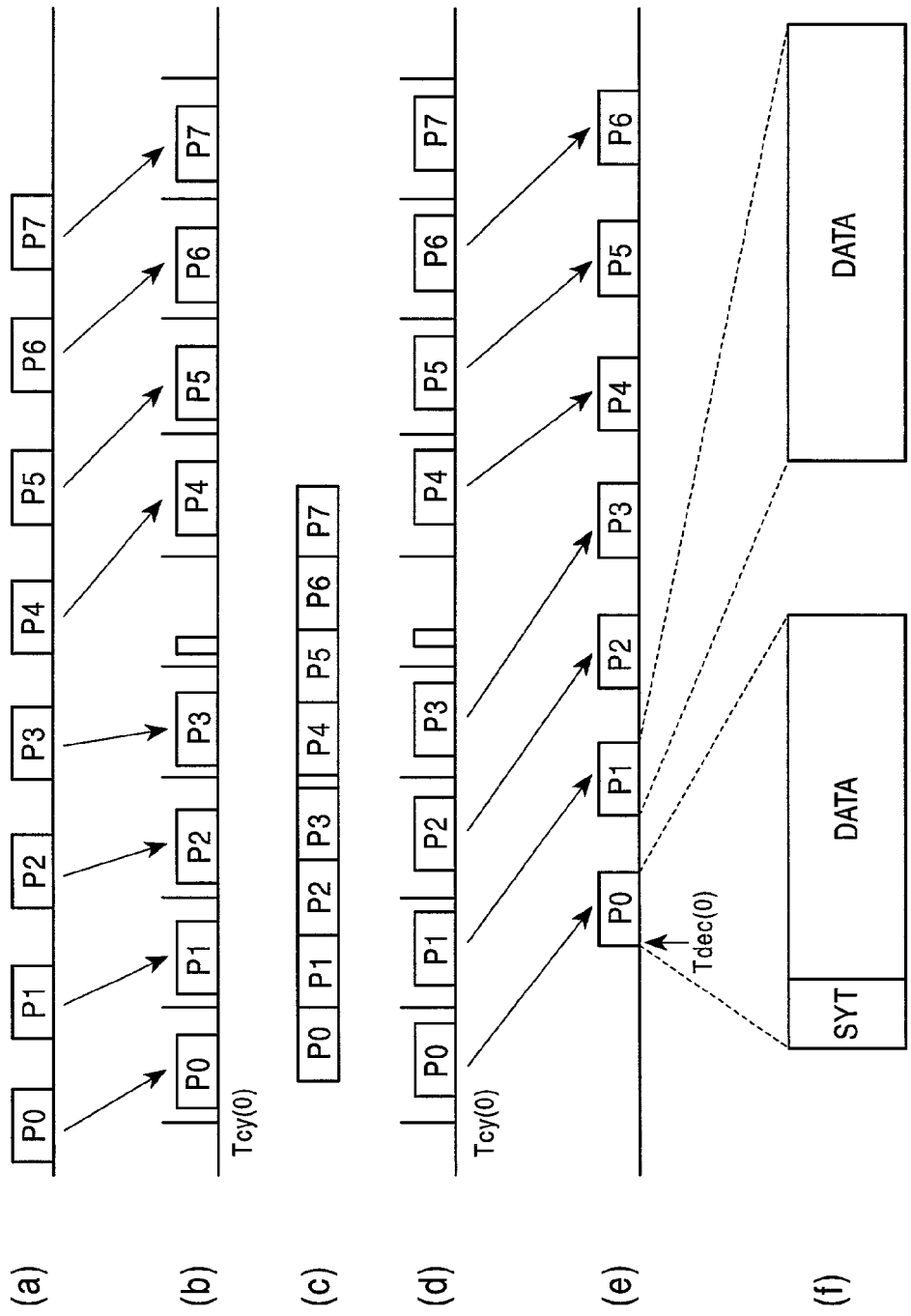

METHOD OF PROCESSING DATA PACKETS, AND VIDEO RECORDING/PLAYBACK APPARATUS INCORPORATING THE METHOD

BACKGROUND OF THE INVENTION

1. Field of the Invention

The present invention relates to a method of processing data packets and to a video apparatus. More particularly, the present invention relates to a method of processing data packets transmitted over a serial bus, for example, an IEEE 1394 bus, and to a video recording/playback apparatus incorporating the method.

2. Description of the Related Art

Conventionally, recording of isochronous data packets transmitted over an IEEE 1394 bus on an intermediate storage medium was only possible in the form of DV (Digital Video) format using a specific type of tape, which requires complex signal processing.

As for isochronous signals other than DV-format, for example, MPEG stream signals, playback apparatuses had not been provided with any method for ensuring appropriate data arrival time.

SUMMARY OF THE INVENTION

Accordingly, it is an object of the present invention to provide a method of ensuring appropriate data arrival time in the transmission of isochronous signals such as MPEG stream signals, and a video recording apparatus and a video playback apparatus incorporating the method.

To this end, in accordance with the present invention, in receiving a series of data packets transmitted over a serial bus, a relative value is taken between a requested time of arrival and a cycle time at the time of reception, and the requested time of arrival is replaced with the relative value. In transmitting the series of data packets over a serial bus, the relative value is added to a cycle time at the time of transmission, so that a requested time of arrival for playback is obtained.

Thus, the present invention allows both DV-format signals and non-DV-format isochronous signals such as MPEG stream signals to be recorded on an intermediate storage medium not based on DV-format, and to be played back appropriately while readily ensuring the requested time of arrival for playback operations.

More specifically, in accordance with an aspect of the present invention, there is provided a method of processing data packets, including the steps of receiving a series of data packets transmitted over a serial bus; with respect to the series of data packets, taking the difference between a requested time of arrival written in a header portion and the cycle time at the time of reception, thereby deriving a relative value between the requested time of arrival and the cycle time; and replacing the requested time of arrival with the relative value. There is also provided a video recording apparatus incorporating the method.

Preferably, in the video recording apparatus, a dummy packet is generated in a range in which data is absent, and all the stream packets including the dummy packet are recorded so that the relative value between the requested time of arrival and the cycle time is obtained.

It is also preferable that the difference-taking step and the replacing step are skipped when the series of data packets is directed to a storage medium in which data storage is based on the cycle time, and are performed when the series of data packets is directed to a storage medium in which data storage is not based on the cycle time.

Furthermore, it is also preferable that the method is compatible with a plurality of data types including a series of data packets in which a header portion is given to each of the data packets, and a series of data packets in which a header portion is given only to the data packet at the beginning thereof.

In accordance with another aspect of the present invention, there is provided a method of processing data packets, including the steps of, with respect to a series of data packets, taking the sum of a relative value, written in a header portion, between a requested time of arrival and a cycle time at the time of reception, and a cycle time at the time of transmission; replacing the relative value with the sum; and transmitting the series of packets over a serial bus. There is also provided a video playback apparatus incorporating the method.

Preferably, in the method and the apparatus, the sum-taking step and the replacing step are skipped when the series of data packets are fed from a storage medium in which data storage is based on the cycle time, and are performed when the series of data packets are fed from a storage medium in which data storage is not based on the cycle time.

In all, the present invention provides a method and an apparatus in which both DV-format and non-DV-format data packets are transmitted and received over a serial bus while being ensured of appropriate data arrival time, regardless of whether or not an intermediate storage medium is used.

BRIEF DESCRIPTION OF THE DRAWINGS

FIG. 5 is a timing diagram showing a relationship between cycle time, data packets, and SYT.

DESCRIPTION OF THE PREFERRED EMBODIMENTS

The below describes preferred embodiments of the present invention with reference to the accompanying drawings.

Figure 3A:
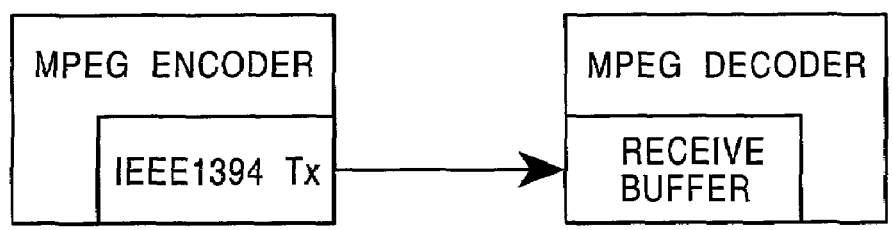
FIGS. 3A, 3B, and 3C show models of data transfer.
Figure 3B:
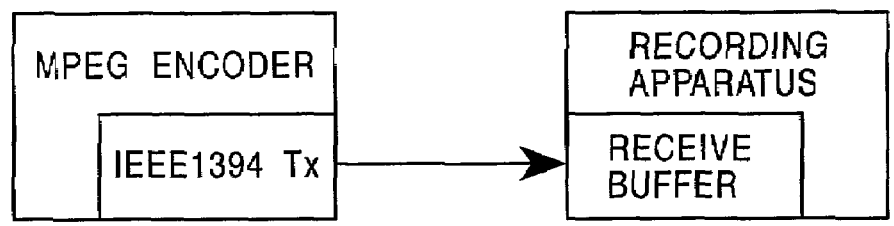
Figure 3C:
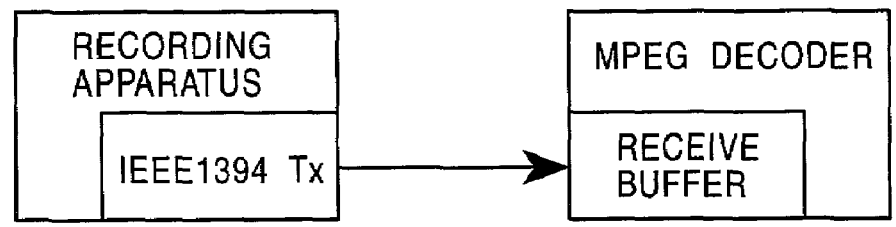

FIG. 3A shows a data transfer model in which data is transferred from an MPEG encoder to an MPEG decoder, FIG. 3B shows a data transfer model in which data is transferred from an MPEG encoder to a recording apparatus, and FIG. 3C shows a data transfer model in which data is transferred from a recording apparatus to an MPEG decoder.

As shown in the figures, the receiving node (i.e., the MPEG decoder or the recording apparatus) incorporates a receive buffer which is designed so as to absorb deviation of arrival time of data streams.

However, if the arrival time of the data streams is excessively earlier or slower than is requested by the decoder, the receive buffer may not be able to absorb the deviation.

When MPEG isochronous data packets are transmitted over an IEEE 1394 bus, each packet output from the transmitting node is given a header including an SPH field. The SPH value indicates the time at which the packet should be received by the receiving node, which will be referred to as requested time of arrival in the following description.

In isochronous data transfer over an IEEE 1394 bus, packet streams are time-multiplexed for transmission. Therefore, the functionality of the transmitting node alone does not guarantee the time of arrival requested by the receiving node. Accordingly, the receiving node need to perform processing for ensuring that data is transferred in appropriate timing.

Thus, the transmitting node calculating the time needed for transfer of the data to obtain the SPH value, and the SPH value is included in the packet and transmitted together with the data.

On the receiving side, the received packets are temporarily stored in a receive buffer. Then, the SPH value at the beginning of each of the packets is read, and is compared against the cycle time of the data. When the SPH value and the cycle time match, the data is transferred from the receive buffer to the receiving node.

The system as described above suffices to transmit data over an IEEE 1394 bus from an MPEG encoder directly to an MPEG decoder as shown in FIG. 3A.

However, when the MPEG data is recorded on or read from a storage medium such as a tape or a disk, the cycle time differs between when the data is recorded on the storage medium and when the data is read from the storage medium. Therefore, if the data recorded on the storage medium is output to an IEEE 1394 bus without any processing, the cycle time and the SPH value do not match in the MPEG decoder, causing an overflow of the receive buffer.

In a video apparatus according to the present invention, in order to avoid the overflow of the receive buffer, when a data packet is received on the receiving end, a difference between the SPH value and the cycle time value is taken, and is stored as a new, relative SPH value of the packet. Furthermore, when the data is transmitted onto an IEEE 1394 bus from the storage medium, the relative SPH value of the packet is added to the cycle time at the time of transmission to obtain a new SPH value which replaces the relative value.

By reproducing dummy packets (packets not including data) together with the data packets (packets actually including data), the recorded signals are played back with reference to the cycle time at the time of playback. Accordingly, regardless of the length of time for which the data is stored in the storage medium, the difference between the cycle time and the SPH value remains the same for recording and for playback, thus ensuring appropriate operation of the video apparatus.

The embodiment will now be described in further detail with reference to FIG. 4.

Figure 4:
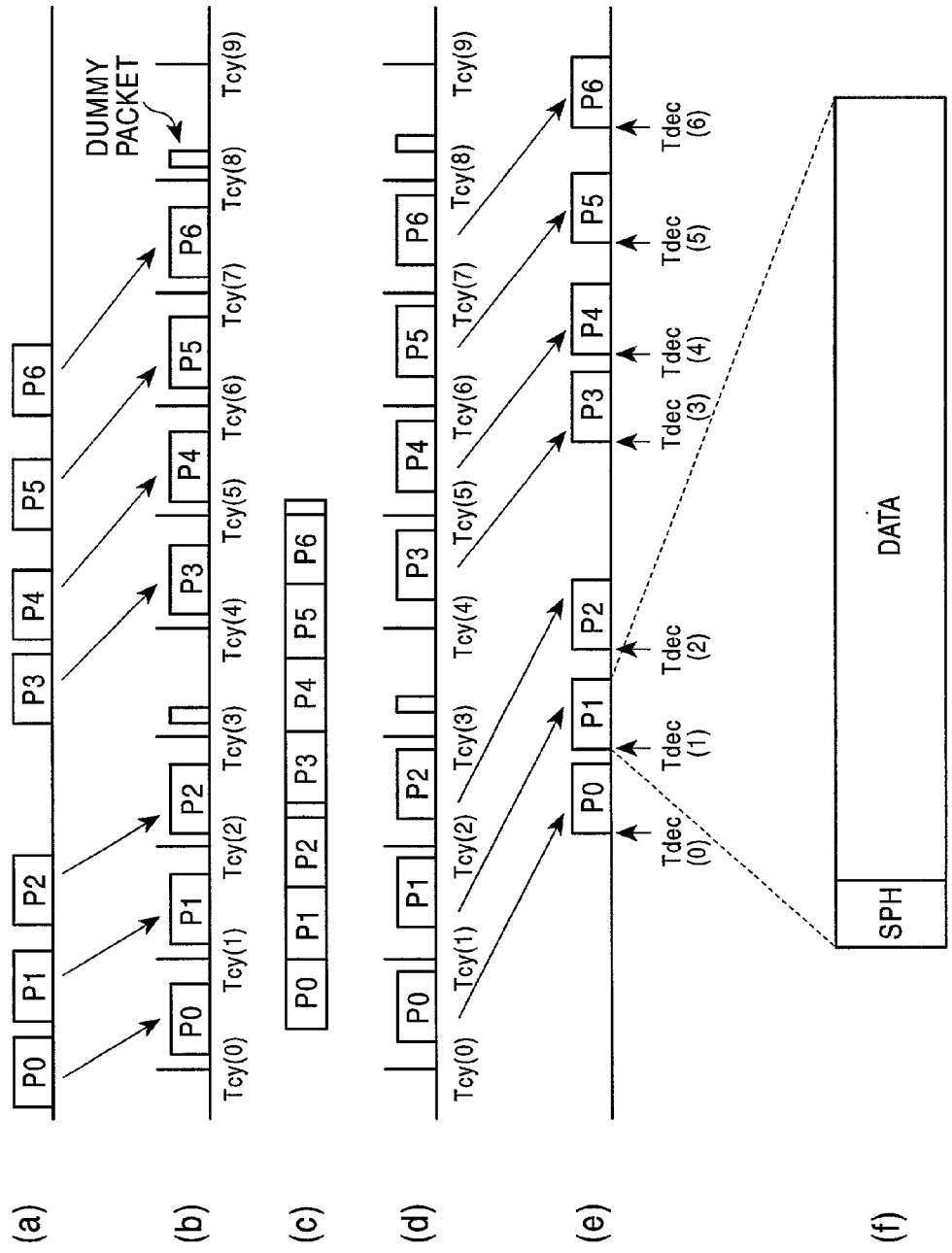
FIG. 4 is a timing diagram showing a relationship between cycle time, data packets, and SPH.

Referring to FIG. 4, (a) shows the arrangement of an original data to be transmitted, and (b) shows the arrangement of the data on the bus during transmission.

The positions of the data on the bus is defined by time positions separated by cycle time Tcy(0), Tcy(1), etc.

The data is stored on the storage medium, such as a hard disk, in an arrangement as shown in (c).

The data read from the storage medium is arranged in time positions separated by cycle time Tcy(0), Tcy(1), etc., as shown in (d). The data packets P0, P1, etc. are received at the requested time of arrival Tdec(0), Tdec(1), etc.

Let the cycle time Tcy(0) be 12,300 and Tcy(1) be 12,400, and Tdec(0) and Tdec(1), the requested time of arrival of packets P0 and P1 stored in the packets, be 12,600 and 12,680. When the stream packets are received and stored in the storage medium, the difference between the SPH value and the cycle time is taken, i.e., 12,600−12,300=300, and 12,680−12400=280. Then, the values are stored as new SPH values for the packet.

When the data is played back, let the cycle time Tcy(0) for the packet P0 be 23,000 and the cycle time Tcy(1) for the packet P1 be 23,100, the time positions of the data read from the storage medium are obtained by respectively adding Tcy(0) and Tcy(1) to the stored relative values 300 and 280, i.e., 300+Tcy(0)=300+23,000=23,300, 280+Tcy(1)=280+23,100=23,380. Based on these values, the receiving node plays back the data appropriately.

Next, a second embodiment of the present invention will be described with reference to FIG. 5.

In this embodiment, a processing similar to that in the first embodiment is performed on DV-format stream packets.

As shown in FIG. 5, DV-format packets include an SYT field indicating requested time of arrival only in the packet at the beginning, the other packets not being given any parameter indicating the requested time of arrival. Thus, when a conversion is performed from the cycle time Tcy(n) to a relative value between the cycle time Tcy(n) and the requested time of arrival Tdec(n), distinction is made between packets including the SYT field and packets not including the SYT field, and the SYT field values are read from the packets including the SYT field, so that synchronous signal processing is performed.

FIG. 5 shows a timing diagram wherein the cycle time of the first packet of a frame is indicated by Tcy(0) and the requested time of arrival of that packet is indicated by Tdec(0). Obviously, there is only one SYT value, i.e., Tcy(0), for each frame in DV-format data streams; thus, only Tcy(0) is used as the cycle time for calculation.

Next, a third embodiment of the present invention will be described below with reference to FIGS. 1 and 2.

Figure 1:
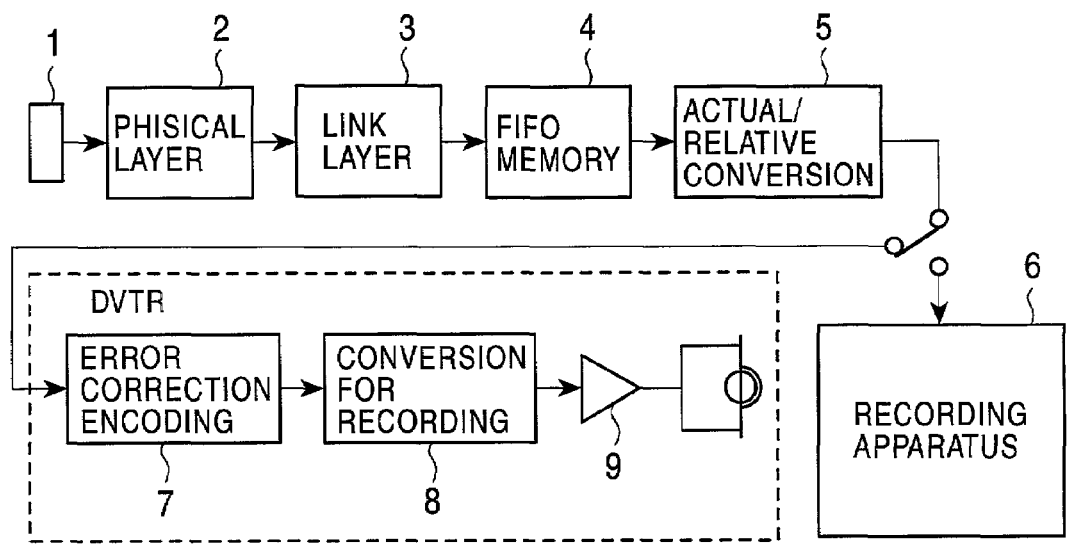
FIG. 1 is a block diagram of a recording system in an embodiment of the present invention.

FIG. 1 shows a block diagram of a recording system. Referring to FIG. 1, data transmitted via a cable 1 is received in a physical layer 2 as electric signals, a link layer 3 performs processing for delivery of data, and accordingly, video data is transferred to an FIFO (First-In First-Out) memory 4.

Data read from the FIFO memory 4 is transferred via a requested time of arrival actual/relative conversion circuit 5, to a DVTR (Digital Video Tape Recorder) or to a recording apparatus 6, such as a hard disk drive, which uses a storage medium in which data storage is not based on the cycle time.

When the output of the FIFO memory 4 is transferred to the DVTR, the actual/relative conversion circuit 5 does not operate; thus, the data bypasses the actual/relative conversion circuit 5 and is forwarded to the DVTR. The data is processed in the DVTR in accordance with methods known to those skilled in the art.

On the other hand, when the output of the FIFO memory 4 is transferred to the recording apparatus 6, the actual/relative conversion circuit 5 operates so as to calculate the relative value between the cycle time and the requested time of arrival. The result is included in the header portion (SPH or SYT) of the data packet and is sent to the recording apparatus 6.

Figure 2:
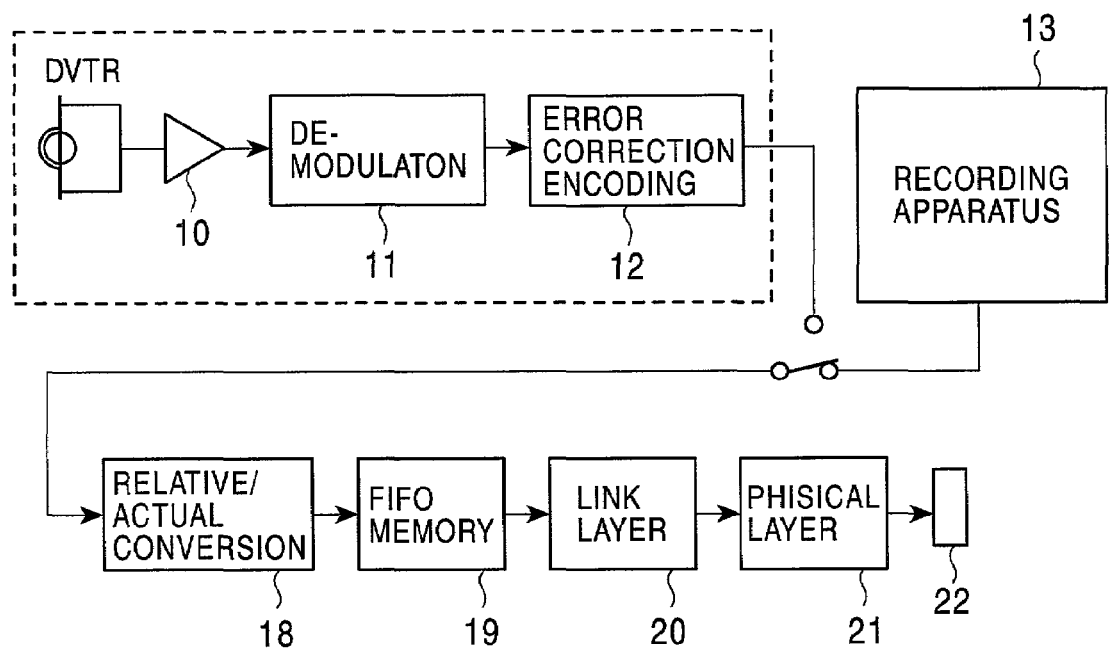
FIG. 2 is a block diagram of a playback system in the embodiment of the present invention.

FIG. 2 shows a block diagram of a playback system, in which the source of video signal is selected to be either a DVTR or a recording apparatus such as a hard disk drive.

Referring to FIG. 2, when an FIFO memory 19 receives data from a DVTR, a requested time of arrival relative/actual conversion circuit 18 does not operate; thus the data bypasses the relative/actual conversion circuit 18 and is forwarded to the FIFO memory 19. On the other hand, when the FIFO memory 19 receives data from a recording apparatus 13 such as a hard disk drive, the relative/actual conversion circuit operates so as to obtain a requested time of arrival based on the cycle time at that moment and a relative value stored in the header of the data packet. The obtained value, together with the data, is forwarded to the FIFO memory 19. The data stored in the FIFO memory 19 is output via a link layer 20, a physical layer 21, and a cable 22 to an IEEE bus in a manner reverse to that in the recording process.

The difference between recording by a DVTR and recording by a recording apparatus such as a hard disk drive will be described below referring again to FIG. 4.

The data packets P0, P1, P", etc. transmitted over an IEEE 1394 bus is arrange in a series of time positions as shown in (b) of FIG. 4. When the data packets are recorded by a DVTR, the time positions are maintained throughout from recording to playback.

On the other hand, when the data packets are recorded by a recording apparatus such as a hard disk drive, the time positions are recorded in the SPH field of the headers of the packets P0, P1, P2, etc. in terms of relative value. When the data is played back, the time positions of the packets are obtained based on the relative value and the cycle time at that moment.

It is to be understood that the system constructions shown in FIGS. 1 and 2 are the same as conventional systems compatible with DV-format and IEEE 1394 bus except for the components designated by 5, 6, 13, and 18. Therefore, the video recording apparatus and the video playback apparatus operates equivalently as conventional systems when the actual/relative conversion circuit 5 and the relative/actual conversion circuit 18 are externally disabled. Obviously, when the conversion circuits are enabled, recording and playback are allowed using a storage medium in which storage is not based on cycle time.

Although description is made hereinabove in the context of data transfer over an IEEE 1394 bus, it is to be appreciated that the present invention is applicable to data transfer over other types of serial bus.

What is claimed is:

1. A method of processing data packets, comprising the steps of:
   receiving a series of data packets transmitted over a serial bus;
   taking a difference between a requested time of arrival written in a header portion and a cycle time at a time of reception with respect to said series of data packets, thereby deriving a relative value between said requested time of arrival and said cycle time;
   replacing said requested time of arrival with said relative value,
   wherein said difference taking step and said replacing step are skipped when said series of data packets is directed to first kind of storage medium in which said series of data packets is stored based on said cycle time, and are preformed when said series of data packets is directed to second kind of storage medium in which said series of data packets is not stored based on said cycle time.

2. A method of processing data packets according to claim 1, wherein said difference taking step and said replacing step are compatible with a series of data packets in which a header portion is given to each of the data packets, and a series of data packets in which a header portion is given only to the leading data packet.

3. A video recording apparatus comprising:
   means for receiving a series of data packets transmitted over a serial bus;
   means for taking the difference between a requested time of arrival written in a header portion and a cycle time at a time of reception with respect to said series of data packets, thereby deriving a relative value between said requested time of arrival and said cycle time;
   means for replacing said requested time of arrival with said relative value; and
   wherein said means for taking a difference and said means for replacing are disabled when said series of data packets is directed to first kind of storage medium in which said series of data packets is stored based on said cycle time, and are enabled when said series of data packets is directed to second kind of storage medium in which said series of data packets is not stored based on said cycle time.

4. A video recording apparatus according to claim 3, further comprising means for generating each dummy packet in a range in which data is absent, and means for recording each said dummy packet together with said series of data packets in said first kind of storage medium or said second kind of storage medium.

5. A method of processing data packets, comprising the steps of:
   taking the sum of a relative value between a requested time of arrival and a cycle time at a time of reception which is written in a header portion and a cycle time at the time of transmission with respect to a series of data packets;
   replacing said relative value with said sum;
   transmitting said series of data packets over a serial bus; and
   wherein said sum-taking step and said replacing step are skipped when said series of data packets are fed from a storage medium in which data storage is based on said cycle time, and are performed when said series of data packets are fed from a storage medium in which data storage is not based on said cycle time.

6. A video playback apparatus comprising:
   means for taking the sum of a relative value between a requested time of arrival and a cycle time at a time of reception which is written in a header portion and a cycle time at the time of transmission with respect to a series of data packets;
   means for replacing said relative value with said sum;
   means for transmitting said series of data packets over a serial bus; and
   wherein said sum-taking means and said replacing means are disabled when said series of data packets are fed from first kind of storage medium in which said series of data is stored based on said cycle time, and are enabled when said series of data packets are fed from second kind of storage medium in which data storage is not stored based on said cycle time.

7. A method of processing data packets according to claim 1, wherein said first kind of storage medium is the medium in which data being stored in DV-format and said second kind of storage medium is the medium in which data being stored in other than DV-format.

8. A method of processing data packets according to claim 7, wherein said first kind of storage medium includes digital video tape and said second kind of storage medium includes a hard disk.

9. A method of processing data packets according to claim 1, further comprising the step of generating each dummy packet in a range in which data is absent on receiving said series of data packets.

10. A video recording apparatus according to claim 3, wherein said first kind of storage medium is the medium in which data being stored in DV-format and said second kind of storage medium is the medium in which data being stored in other than DV-format.

11. A video recording apparatus according to claim 10, wherein said first kind of storage medium includes digital video tape and said second kind of storage medium includes a hard disk.

12. A method of processing data packets according to claim 5, wherein said first kind of storage medium is the medium in which data being stored in DV-format and said second kind of storage medium is the medium in which data being stored in other than DV-format.

13. A method of processing data packets according to claim 12, wherein said first kind of storage medium includes digital video tape and said second kind of storage medium includes a hard disk.

14. A method of processing data packets according to claim 5, further comprising the step of reproducing a number of dummy packets together with said series of data packets.

15. A video playback apparatus according to claim 6, wherein said first kind of storage medium is the medium in which data being stored in DV-format and said second kind of storage medium is the medium in which data being stored in other than DV-format.

16. A video playback apparatus according to claim 15, wherein said first kind of storage medium includes digital video tape and said second kind of storage medium includes a hard disk.

17. A video playback apparatus according to claim 6, further comprising means for reproducing a number of dummy packets together with said series of data packets.

* * * * *